United States Patent
Crespo et al.

(10) Patent No.: US 9,803,701 B2
(45) Date of Patent: Oct. 31, 2017

(54) DRIVE ASSEMBLY INCLUDING A DAMPER AND CLUTCH PLATE SUBASSEMBLY AND METHOD OF FORMING DRIVE ASSEMBLIES

(71) Applicant: Schaeffler Technologies AG & Co. KG, Herzogenaurach (DE)

(72) Inventors: Daniel Patiño Crespo, Puebla (MX); Guillermo Castrezana, Puebla (MX)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 36 days.

(21) Appl. No.: 14/854,914

(22) Filed: Sep. 15, 2015

(65) Prior Publication Data

US 2016/0076600 A1    Mar. 17, 2016

Related U.S. Application Data

(60) Provisional application No. 62/051,366, filed on Sep. 17, 2014.

(51) Int. Cl.
*F16D 13/64* (2006.01)

(52) U.S. Cl.
CPC ...... *F16D 13/64* (2013.01); *F16D 2250/0084* (2013.01); *F16D 2300/22* (2013.01)

(58) Field of Classification Search
CPC .. F16D 13/64; F16D 13/68; F16D 2250/0084; F16F 15/32
USPC .............................. 192/107 R, 212
See application file for complete search history.

(56) References Cited

U.S. PATENT DOCUMENTS

| | | | | |
|---|---|---|---|---|
| 2,571,291 A | * | 10/1951 | Reed | F16D 13/644 192/212 |
| 3,095,716 A | * | 7/1963 | Smirl | F16D 13/68 192/109 R |
| 4,586,596 A | * | 5/1986 | Schmid | F16F 15/129 192/213.31 |
| 5,655,641 A | * | 8/1997 | Ament | F16D 13/64 192/110 R |
| 7,686,147 B2 | * | 3/2010 | Friedmann et al. | F16D 21/06 192/48.8 |

FOREIGN PATENT DOCUMENTS

GB            2097099 A  * 10/1982  ......... F16F 15/1205

* cited by examiner

*Primary Examiner* — Richard Lorence
(74) *Attorney, Agent, or Firm* — Davidson, Davidson & Kappel, LLC

(57) ABSTRACT

A drive assembly for a motor vehicle clutch is provided. The drive assembly includes a damper including a plurality of springs, a first cover plate and second cover plate. The first and second cover plates support the springs therebetween and the second cover plate includes an outer portion extending radially outside of the first cover plate. The drive assembly further includes a subassembly including at least one clutch facing and at least one support segment supporting the at least one clutch facing. The at least one support segment includes an outer radial portion fixed to the at least one clutch facing and an inner radial portion connected to the outer portion of the second cover plate to connect the subassembly to the damper.

16 Claims, 7 Drawing Sheets

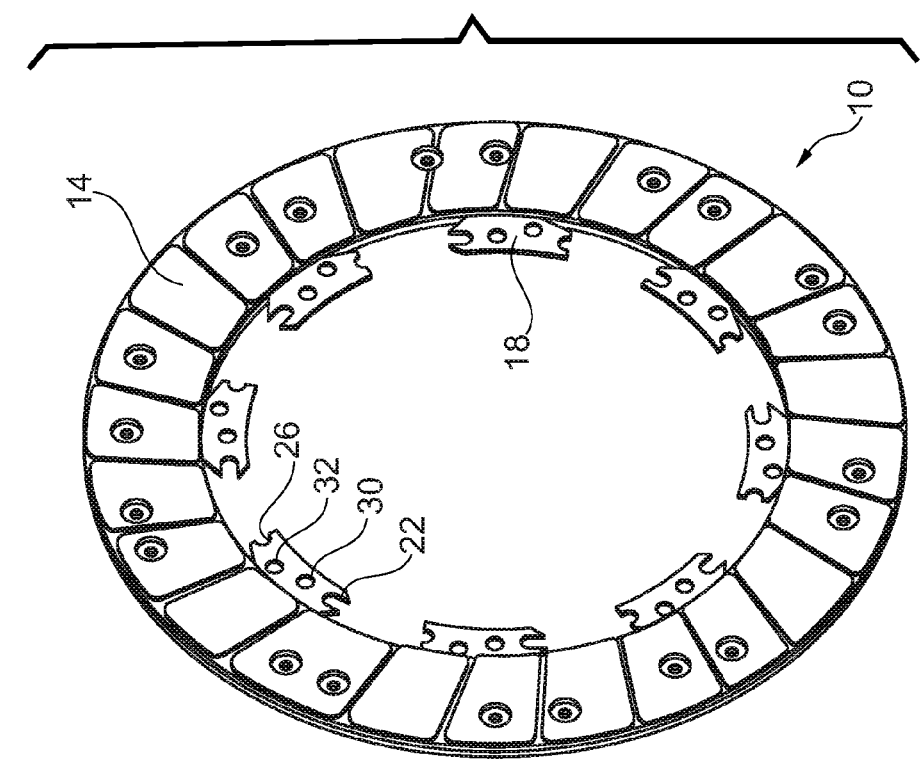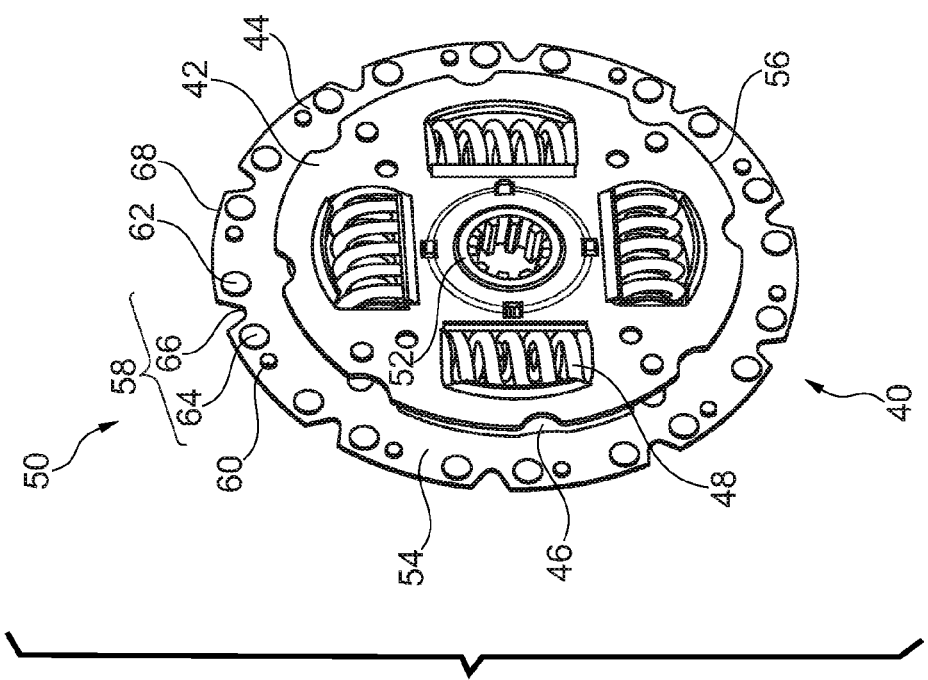
Fig. 2

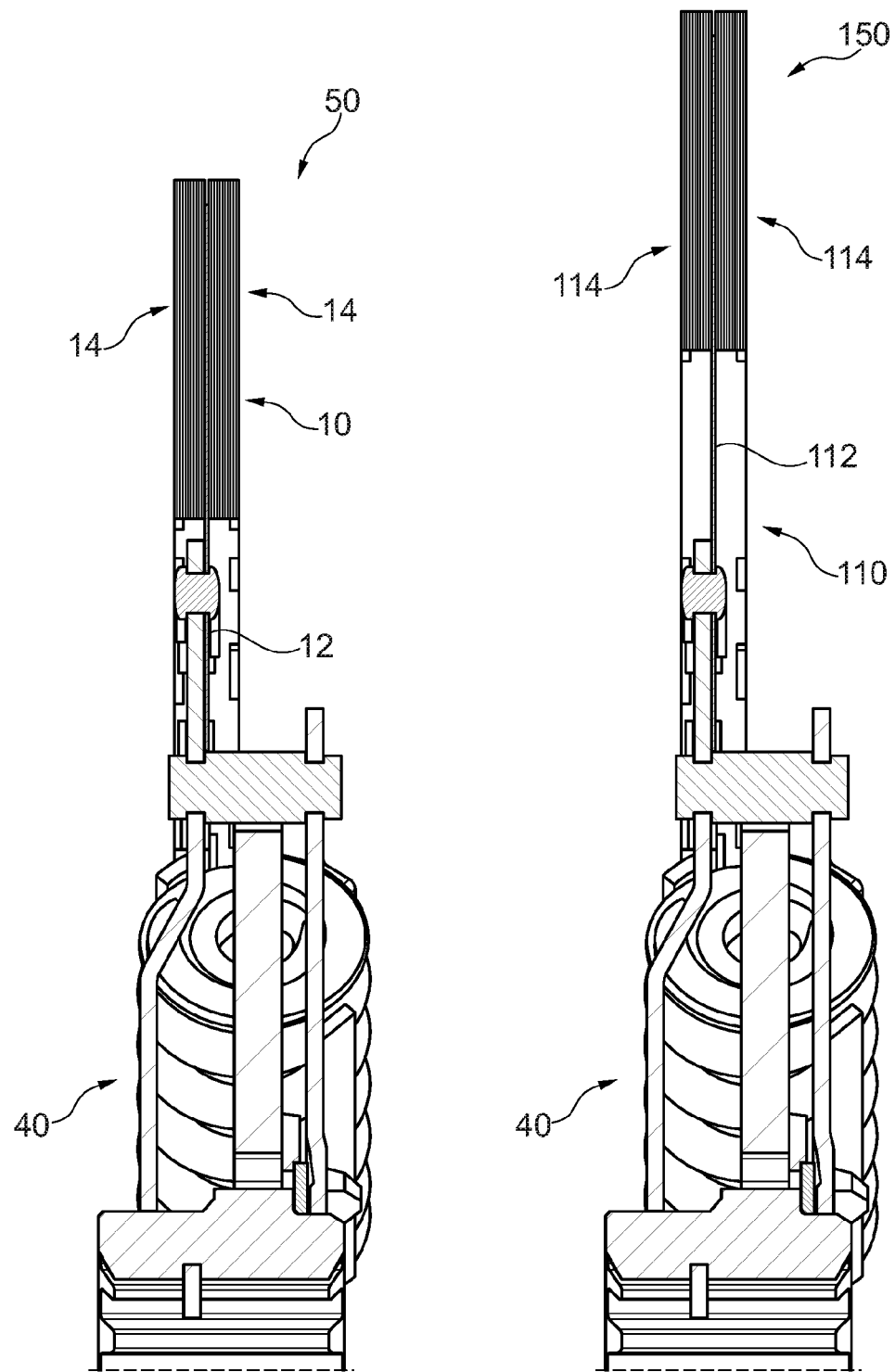

DRIVE ASSEMBLY INCLUDING A DAMPER AND CLUTCH PLATE SUBASSEMBLY AND METHOD OF FORMING DRIVE ASSEMBLIES

This claims the benefit to U.S. Provisional Patent Application No. 62/051,366 filed Sep. 17, 2014, which is hereby incorporated by reference herein.

The present disclosure relates generally to clutches and more specifically to drive assemblies including dampers and clutch plates.

BACKGROUND

Conventionally, a subassembly is formed including clutch facings, support segments for the clutch facings and a retainer plate for the support segments. Once assembled, a damper is fixed piece-by-piece onto the retainer plate.

SUMMARY OF THE INVENTION

A drive assembly for a motor vehicle clutch is provided. The drive assembly includes a damper including a plurality of springs, a first cover plate and second cover plate. The first and second cover plates support the springs therebetween and the second cover plate includes an outer portion extending radially outside of the first cover plate. The drive assembly further includes a subassembly including at least one clutch facing and at least one support segment supporting the at least one clutch facing. The at least one support segment includes an outer radial portion fixed to the at least one clutch facing and an inner radial portion connected to the outer portion of the second cover plate to connect the subassembly to the damper.

A drive assembly for a motor vehicle clutch is also provided that includes a damper including a plurality of damper connectors and a subassembly including at least one clutch facing and at least one support segment supporting the at least one clutch facing. The at least one support segment includes a plurality of segment connectors. The damper connectors and segment connectors are configured to snap together.

A method for forming a drive assembly for a motor vehicle clutch is also provided. The method includes assembling a damper including a cover plate; assembling a subassembly including at least one clutch facing and at least one support segment; and mounting the at least one support segment onto the cover plate.

BRIEF DESCRIPTION OF THE DRAWINGS

The present invention is described below by reference to the following drawings, in which:

FIG. 1b shows enlarged view of a support segment of the clutch subassembly shown in FIG. 1a;

FIG. 2 shows an exploded perspective view of a drive assembly in accordance with an embodiment of the present invention;

FIG. 4b shows a cross-sectional side view of the drive assembly along A-A in FIG. 4a;

FIGS. 5a and 5b illustrate how embodiments of the present invention may advantageously allow dampers of the same design to be used with clutch facings of different diameters;

FIG. 6b illustrates a side view of a tool being used to complete rivets to connect a subassembly and a damper to form the drive assembly shown in FIG. 6a.

DETAILED DESCRIPTION

The present disclosure provides a drive assembly including a universal damper able to be assembled with different diameters of facings and support segments. The drive assembly may include a segment with a different type of holes that allows a facings/segments subassembly to be assembled with a previously assembled damper using pins. The sub assembly is positioned to the point where a formed foot of each segment is close to a respective pin so the formed foot can enter underneath it the respective pin, then the assembly is turned about a center axis of the damper until there is a click indicating that the pins have passed through other holes in the segments. Such an arrangement allows the production of dampers with pins for many facing diameter configurations.

Figure 1A:
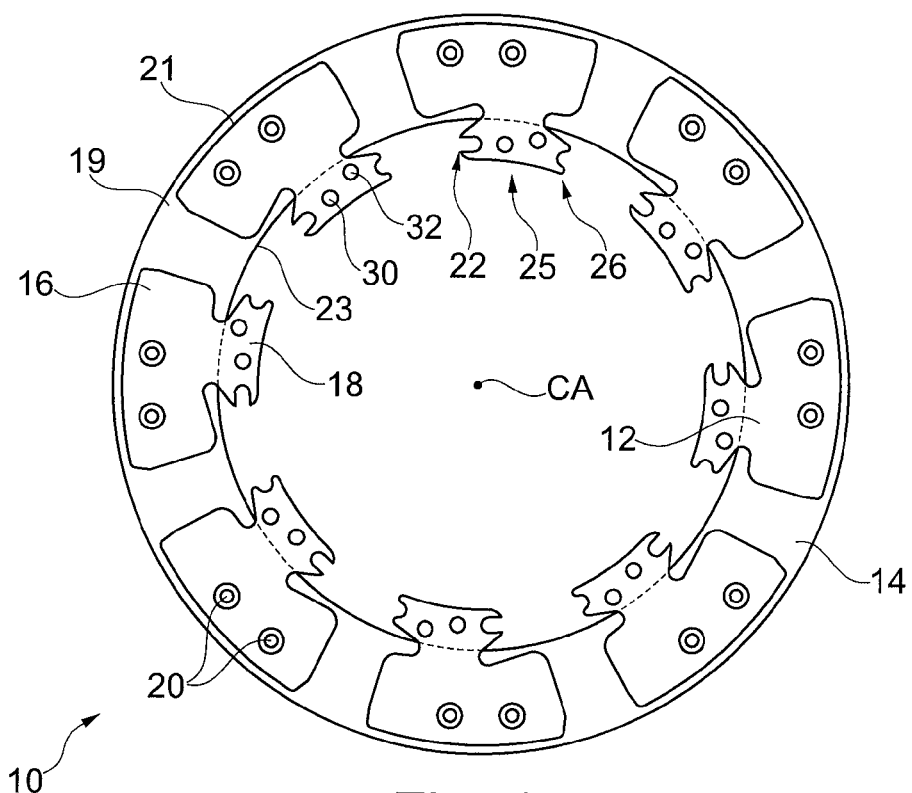
FIG. 1a shows a plan view of a clutch subassembly in accordance with an embodiment of the present invention.
Figure 1B:
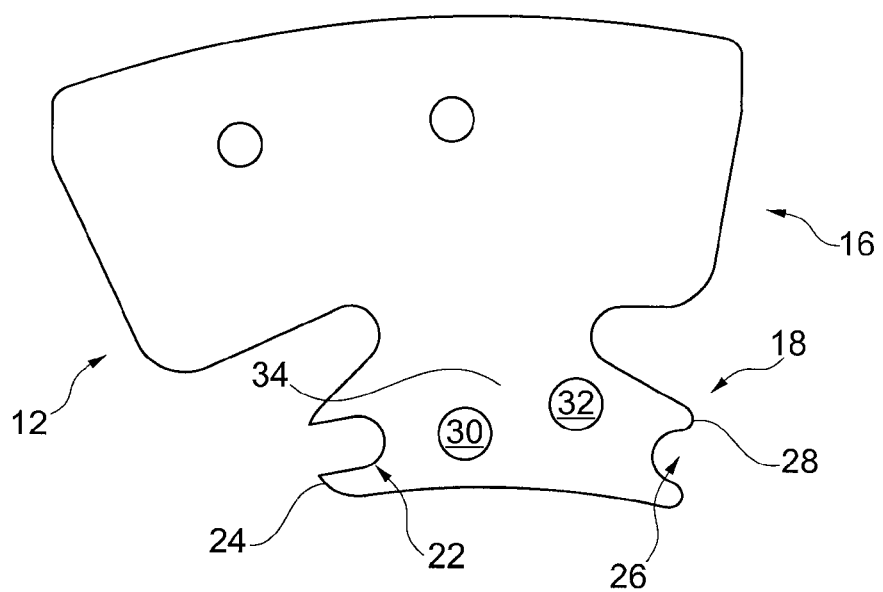

FIG. 1a shows a plan view of a clutch subassembly 10 in accordance with an embodiment of the present invention. Clutch subassembly 10 includes a plurality of support segments 12 supporting at least one clutch facing 14. An enlarged view of one of support segments 12 is shown in FIG. 1b. In this embodiment, support segments 12 support two clutch facings 14, one on a first axial surface thereof (i.e., the top surface) and one on a second axial surface thereof opposite the first axial surface (i.e., the bottom surface), such that segments 12 are each axially sandwiched between the facings 14. As is conventional, clutch facings 14 are formed of friction material, such as friction paper.

Support segments 12 each include a radially outer portion 16 fixed to clutch facings 14 and a radially inner portion 18, i.e., a formed foot, for connection to a cover plate of a damper 40, as discussed in further detail below. In this embodiment, an outer circumferential surface 19 of clutch facings 14 is radially outside of an outer radial surface 21 of each support segment 12. Radially outer portions 16 are fixed to facings 14 by fasteners 20 that pass through facings 14 and the respective support segment 12 and contact outer axial surfaces of facings 14. In a preferred embodiment, fasteners 20 are rivets.

Radially inner portions 18 extend radially inside of an inner circumferential surface 23 of clutch facings 14. Radially inner portion 18 of each segment 12 includes a respective segment connector 25 formed by a main support slot 22 formed in a first circumferential edge 24 of the radially inner portion 18, an additional support slot 26 on a second circumferential edge 28 of the radially inner portion 18 on an opposite side as first circumferential edge 24 and at least one hole 30, 32 in a body 34 of radially inner portion 18 between edges 24, 28. Together, slots 22, 26 and holes 30, 32 form segment connectors of support segments 12. In this embodiment, holes 30, 32 are slightly radially offset from each other, with first hole 30 being slightly closer to a center axis of subassembly 10 than second hole 32. After subassembly 10 is formed it may be connected to damper 40 (FIG. 2) via connectors 25 of radially inner portion 18.

FIG. 2 shows an exploded perspective view of drive assembly 50 in accordance with an embodiment of the present invention. Damper 40 includes a first cover plate 42, a second cover plate 44 and a drive flange 46 sandwiched axially between cover plates 42, 44. First cover plate 42 and second cover plate 44 hold springs 48 therebetween in circumferentially extending slots formed in cover plates 42, 44 and contact circumferential edges of springs 48 during operation of drive assembly 50 such that cover plates 42, 44 circumferentially drive springs 48. During operation of drive assembly 50, edges of circumferential slots formed in drive flange 46 are contacted by the circumferential edges of springs 48 such that springs 48 circumferentially drive drive flange 46, which in turn drives a hub 52 of damper 40.

Second cover plate 44 has a greater diameter than first cover plate 42 and includes a radially outer portion 54 that extends radially outward past an outer circumference 56 of first cover plate 42. Radially outer portion 54 is divided into a plurality of cover or damper connectors 58, one for each support segment 12. Connectors 58 each include pins 60, 62, 64. A first pin 60 is configured for sliding into main slot 24, a second pin 62 is configured for sliding into additional slot 26 and a third pin 64 configured for sliding into hole 30. The sliding of slots 22, 26 and hole 30 onto pins 60, 62, 64, respectively, causes cover connectors 58 and segment connectors 25 to snap together. Additionally, each connector 58 may be provided with a radially extending slot 66 extending inward from an outer circumference 68 of cover plate 44 between pins 62, 64 for aligning with hole 32 and receiving a rivet for balancing assembly 50 after connectors 25 of segments 12 are connected to connectors 58 of second cover plate 44.

Figure 3A:
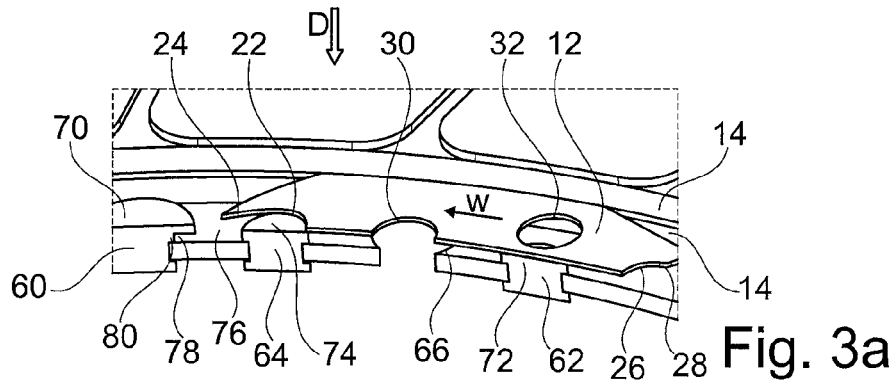
FIGS. 3a to 3d illustrate the snapping of connectors of support segments onto connectors of a damper of the drive assembly.
Figure 3B:
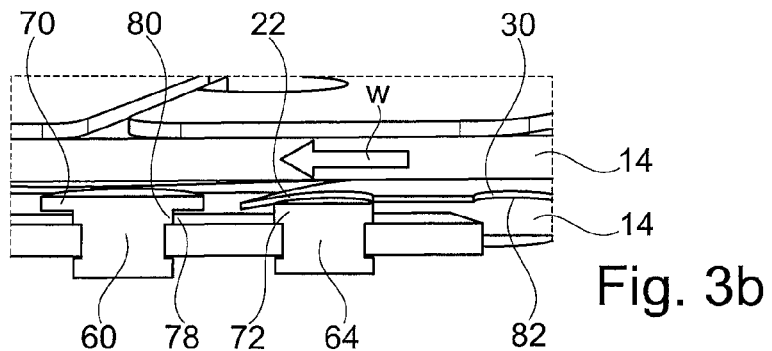
Figure 3C:
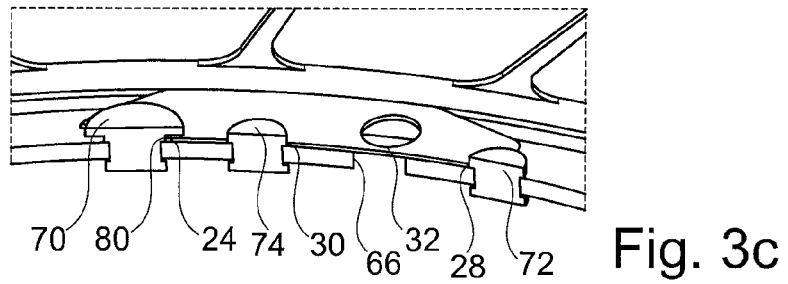
Figure 3D:
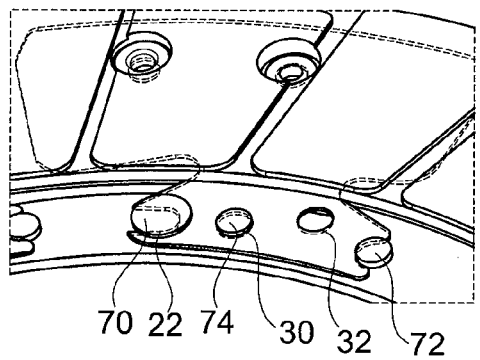

FIGS. 3a to 3d illustrate the snapping of connectors 25 of support segments 12 onto connectors 58 of cover plate 44. FIGS. 3a to 3c show cross-sectional perspective views illustrating the connection of one segment 12 and a section of cover plate 44 and FIG. 3d shows a perspective view after the connection. As shown in FIG. 3a, subassembly 10, which includes segments 12 sandwiched between two facings 14, is forced in a direction D downward onto damper 40 and rotated in a direction W, which in the view shown in FIG. 3a is counterclockwise. Subassembly 10 is being rotated in direction W such that slot 22 aligns with pin 60, hole 30 aligns with pin 64, slot 26 aligns with pin 62 and hole 32 aligns with slot 66. As shown in FIG. 3a, pin 60 includes a head 70 that is larger than a head 72 of pin 62 and a head 74 of pin 64. Pin 60 is also longer than pins 62, 64 and includes a step 80 adjacent to head 70 for contacting an axial surface 76 of cover plate 44, such that head 70 of pin 60 is spaced from axial surface 76 so as to provide a gap 78 for receiving circumferential edge 24 of segment 12 at slot 22. In contrast, heads 72, 74 contact axial surface 76.

FIG. 3b shows connectors 25, 58 at the same point in the connecting, but from a slightly different perspective view. As circumferential edge 24 at slot 22 is positioned over head 72 of pin 62, subassembly 10 is forced further toward cover plate 44 such that an axial surface 82 of segment 12 facing cover plate 44 contacts head 72.

As subassembly 10 is further rotated in direction W, circumferential edge 24 at slot 22 enters into gap 78 and circumferential edge 24 contacts step 80 and pin 60 is received into slot 22. As shown in FIGS. 3c and 3d, when pin 60 is received into slot 22, head 74 of pin 64 is received into hole 30, and circumferential edge 28 contacts head 72 of pin 62 and pin 62 is received into slot 26 such that segment connector 25 snaps onto cover connector 58, resulting in a clicking noise. Head 70 extends radially outward past a profile of slot 22. Additionally, hole 32 of segment 12 is aligned with radially extending slot 66 in cover plate 44. Subassembly 10 is pressed in direction D and rotated in direction W such that each connector 25 snaps onto the respective connector 58 at approximately the same time.

Figure 4A:
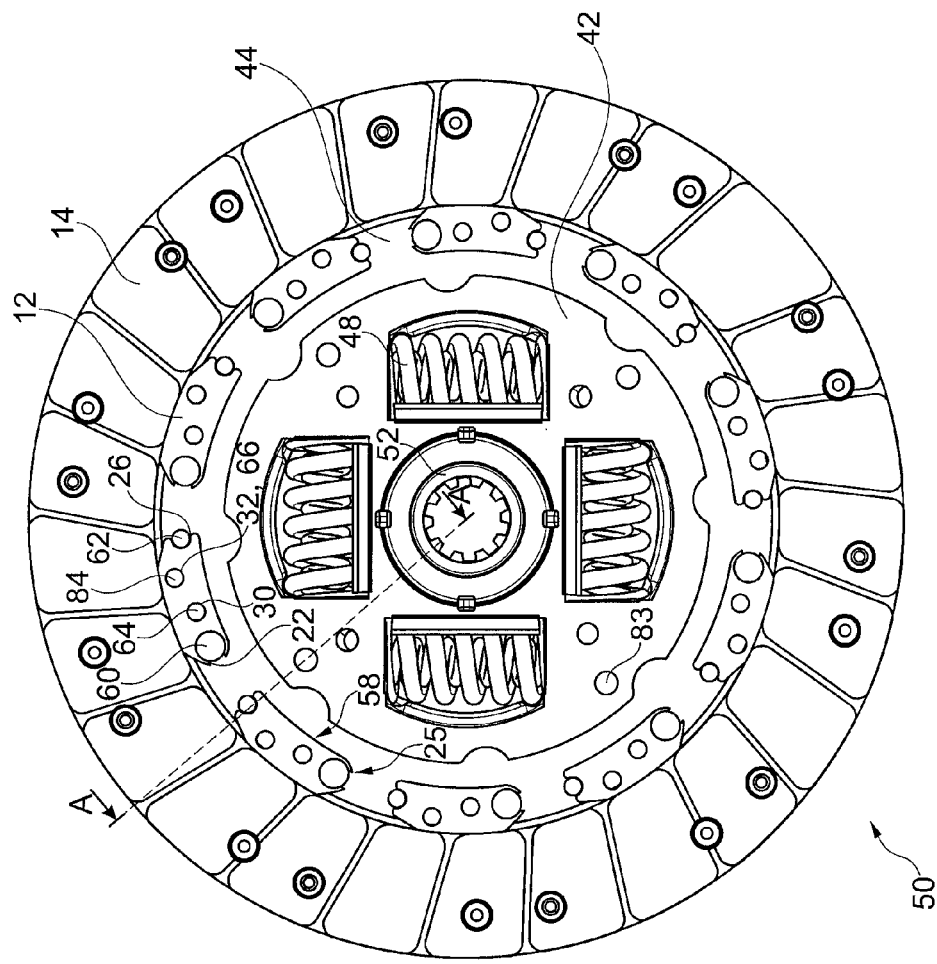
FIG. 4a shows a plan view of the drive assembly shown in FIG. 2.
Figure 4B:
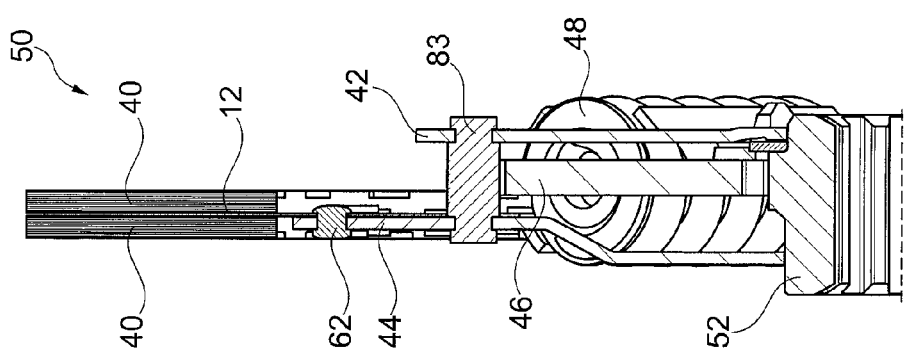

FIG. 4a shows a plan view of drive assembly 50 after subassembly 10 has been connected to damper 40; and FIG. 4b shows a cross-sectional side view of drive assembly 50 along A-A in FIG. 4a. As noted above, subassembly 10 includes two clutch facings 14 connected to a plurality of support segments 12 and damper 40 includes two cover plates 42, 44 riveted together by rivets 83, springs 48 held by cover plates 42, 44, drive flange 46 axially between cover plates 42, 44 and hub 52 drive by drive flange 46. Segment connectors 25 are each connected to a respective cover or damper connector 58 by pins 60 being in slot 22s, pins 64 being in holes 30 and pins 62 being in slots 26. Support segments 12 are mounted on second cover plate 44 at an axial side of second cover plate 44 facing first cover plate 42. Additionally, holes 32 of segments 12 are aligned with slots 66 in cover plate 44 and rivets 84 are each in the respective hole 32 and slot 66 for balancing drive assembly 50.

FIGS. 5a and 5b illustrate how embodiments of the present invention may advantageously allow dampers 40 of the same design and size to be used with clutch facings 14, 114 of different diameters. Drive assembly 50, also shown in FIG. 4b, is shown in FIG. 5a and a further drive assembly 150, which has a greater outer diameter than drive assembly 50, is shown in FIG. 5b. Both drive assemblies 50, 150 utilize the same damper 40, but drive assembly 150 includes a clutch subassembly 110 having a greater outer diameter than clutch assembly 10. In this example, support segments 112 have a greater radial length than support segments 12 and clutch facings 114 have a greater inner diameter and outer diameter than clutch facings 14.

Figure 6A:
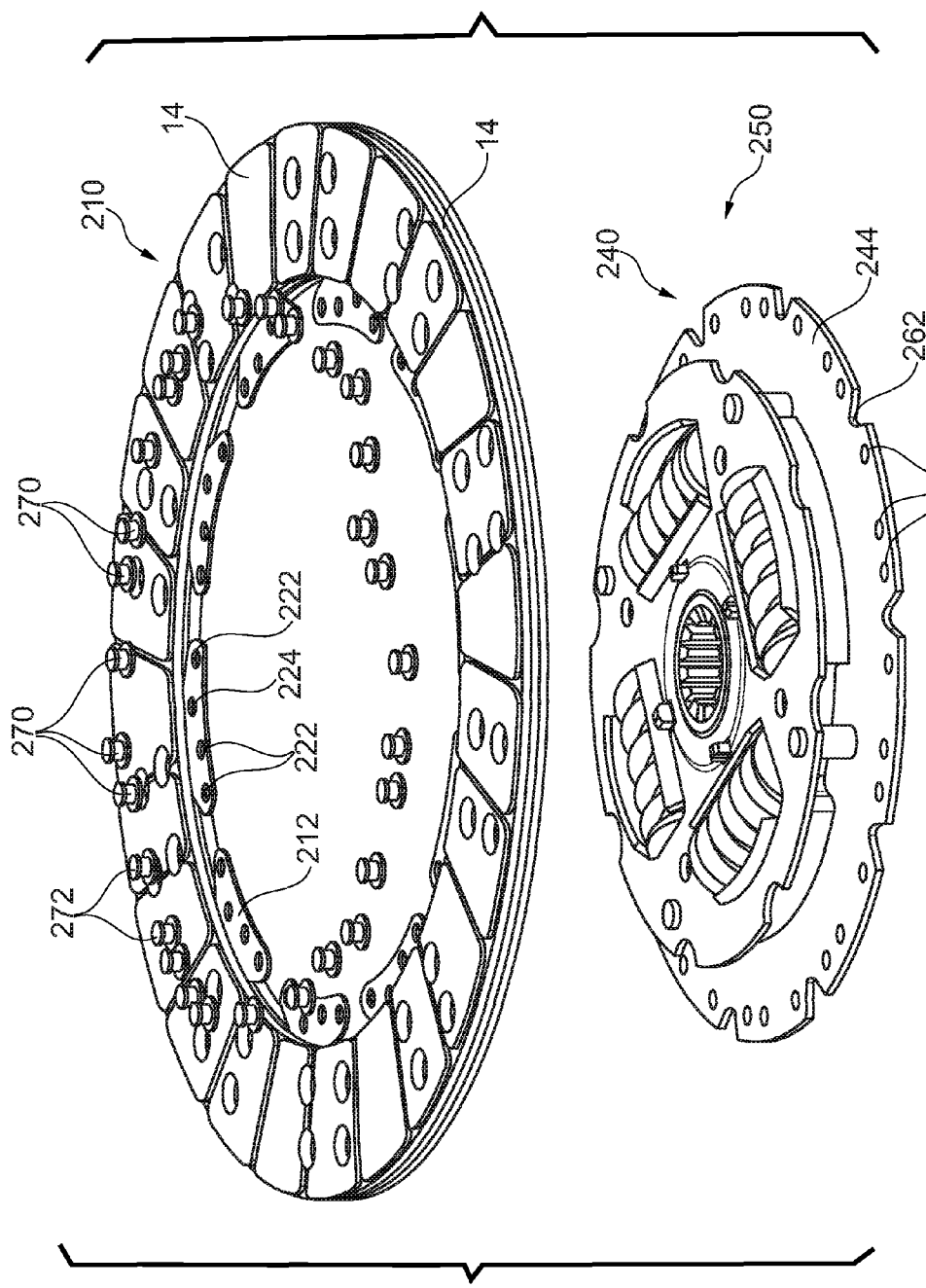
FIG. 6a shows an exploded perspective view of a drive assembly in accordance with another embodiment of the present invention.

FIG. 6a illustrates an exploded perspective view of a drive assembly 250 in accordance with another embodiment of the present invention. Drive assembly 250 includes a clutch subassembly 210 and a damper 240. Subassembly 210 is configured in the same manner as subassembly 10, except that clutch facings 14 are supported by support segments 212 each including a plurality of radially aligned holes 222 therein, and a further hole 224 slightly radially offset from holes 222. Damper 240 is configured in the same manner as damper 40, except that a cover plate 244 of damper 240 includes a plurality of holes 260 at a radially outer portion thereof. Damper 240 and subassembly 210 are connected by aligned holes 222 with respective holes 260 and providing a rivet 270 through each aligned set of holes 222, 260. Rivets 270 in FIG. 6a are shown before rivet ends 272 are displaced to form completed rivets. Additionally, a rivet 270 is passed through each hole 224 and a corresponding radially extending slot 262 at the outer circumference of cover plate 244 for balancing drive assembly 250.

Figure 6B:
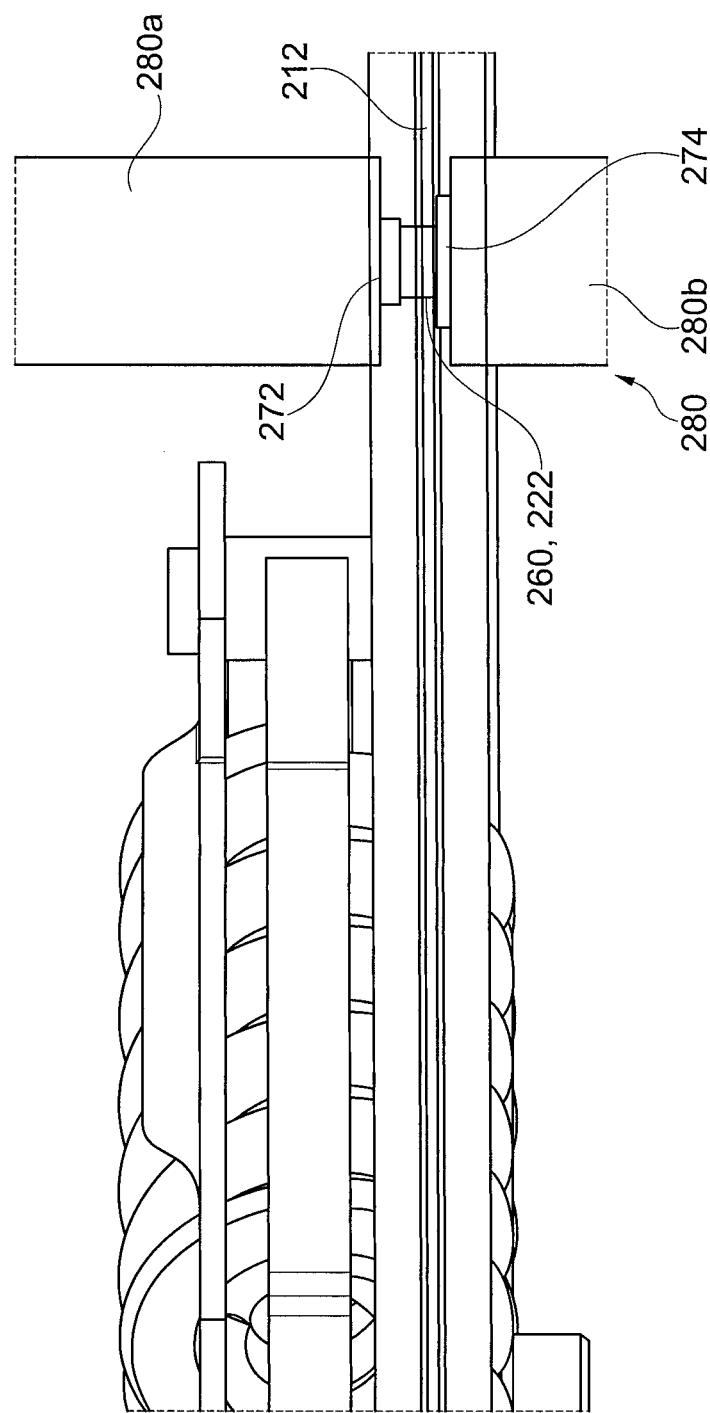

FIG. 6b illustrates a side view of a tool 280 being used to complete rivets 270 to connect subassembly 210 and damper 240. Tool 280 includes a first section 280a for contacting end 272 and a second section 280b for contacting a rivet head 274. Second section 280b acts a back stop for rivet 270 as tool section 280a contacts end 272 force material of end 272 radially outward to form a second head. The forming of the second head completes rivet 270 and fixes segment 212 to cover plate 244.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A drive assembly for a motor vehicle clutch comprising:
   a damper including a plurality of springs, a first cover plate and second cover plate, the first and second cover plates supporting the springs therebetween, the second cover plate including an outer portion extending radially outside of the first cover plate; and
   a subassembly including at least one clutch facing and at least one support segment supporting the at least one clutch facing, the at least one support segment including an outer radial portion fixed to the at least one clutch facing and an inner radial portion connected to the outer portion of the second cover plate to connect the subassembly to the damper,
   wherein the second cover plate includes a plurality of cover connectors and the at least one support segment includes a plurality of segment connectors, the cover connectors and segment connectors being configured to snap together,
   wherein the cover connectors include a plurality of first pins and the segment connectors include a plurality of first slots, each of the first pins being received in one of the first slots.

2. The drive assembly as recited in claim 1 wherein each of the first pins includes a head, each head extending radially outward past a profile of the corresponding first slot.

3. The drive assembly as recited in claim 1 wherein the at least one segment includes a plurality of segments, each of the segments including one of the first slots.

4. The drive assembly as recited in claim 3 wherein the segment connectors include a plurality of holes, each of the segments including at least one of the holes, the cover connectors including a plurality of second pins, each of the second pins being in one of the holes.

5. The drive assembly as recited in claim 1 wherein the inner radial portion is riveted to the outer portion of the second cover plate.

6. The drive assembly as recited in claim 1 wherein the at least one facing includes two clutch facings, the at least one segment being sandwiched between the two clutch facings.

7. The drive assembly as recited in claim 1 wherein the damper includes a drive flange axially between the first cover plate and the second cover plate, the springs arranged for driving the drive flange.

8. The drive assembly as recited in claim 7 wherein the damper includes a hub, the drive flange being rotationally fixed to the hub.

9. The drive assembly as recited in claim 1 wherein the at least one support segment is mounted on the second cover plate at an axial side of the second cover plate facing the first cover plate.

10. A drive assembly for a motor vehicle clutch comprising:
    a damper including a plurality of damper connectors;
    a subassembly including at least one clutch facing and at least one support segment supporting the at least one clutch facing, the at least one support segment including a plurality of segment connectors, the damper connectors and segment connectors being configured to snap together,
    wherein the damper connectors include a plurality of first pins and the segment connectors include a plurality of first slots, each of the first pins being received in one of the first slots.

11. The drive assembly as recited in claim 10 wherein the segment connectors include a plurality of holes, the cover connectors including a plurality of second pins, each of the second pins being in one of the holes.

12. A method of forming a plurality of drive assemblies comprising:
    assembling a damper including a cover plate;
    assembling a subassembly including at least one clutch facing and at least one support segment;
    mounting the at least one support segment onto the cover plate to form a first drive assembly;
    assembling a further damper including a further cover plate a same size as the cover plate;
    assembling a further subassembly including at least one further clutch facing and at least one further support segment, the at least one further clutch facing having an inner diameter and an outer diameter greater than that of the at least one clutch facing; and
    mounting the at least one further support segment onto the further cover plate to form a second drive assembly different from the first drive assembly.

13. The method as recited in claim 12 wherein the cover plate includes a plurality of cover connectors and the at least one support segment includes a plurality of segment connectors, the mounting including snapping of the cover connectors and the segment connectors together.

14. The method as recited in claim 13 wherein the cover connectors include a plurality of first pins and the segment connectors include a plurality of first slots, each of the first pins being slid into one of the first slots during the snapping of the cover connectors and the segment connectors together.

15. The method as recited in claim 14 wherein the segment connectors include a plurality of holes, the cover connectors including a plurality of second pins, each of the second pins being slid into one of the holes during the snapping of the cover connectors and the segment connectors together.

16. The method as recited in claim 13 wherein the mounting includes rotating the subassembly with respect to the damper to snap the segment connectors onto the cover connectors.

* * * * *